United States Patent Office 3,512,423
Patented May 19, 1970

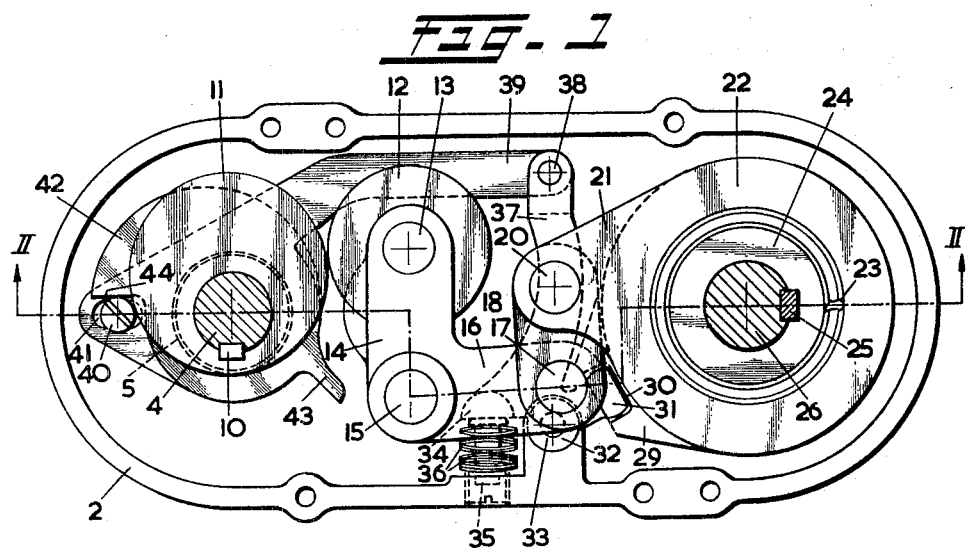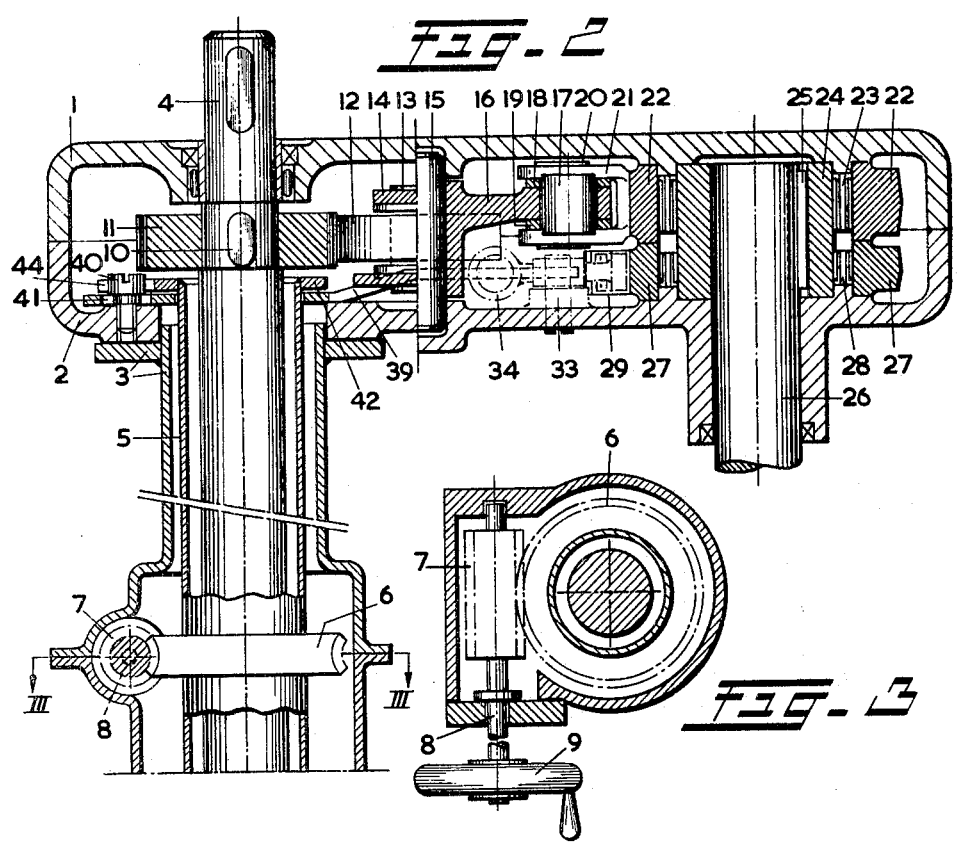

3,512,423
INTERMITTENT DRIVE MECHANISM HAVING SELF-COMPENSATING MEANS FOR OFFSETTING THE EFFECTS OF DEVELOPED COUNTERTORQUE
Johannes Schuitemaker, Holten, Netherlands, assignor to Schuitemaker Patents S.A., Luxembourg, Luxembourg, a corporation of Luxembourg
Filed Jan. 23, 1968, Ser. No. 699,913
Claims priority, application Netherlands, Jan. 24, 1967, 6701093
Int. Cl. F16h 27/02
U.S. Cl. 74—125.5                    8 Claims

ABSTRACT OF THE DISCLOSURE

A drive mechanism for a step-wise drive comprising a one-way coupling and means for compensating the influence of springing of the elements of the coupling upon a varying driving force, so that the effective driving stroke is constant.

---

The present invention relates to a drive mechanism for the step-wise drive of, for example, the mechanical handling equipment of a motor-truck or trailer. The mechanism comprises a one-way clutch including a drive element periodically operative in a driving direction and a member driven by the drive element, the drive element being capable of performing a free return stroke opposite to the driving direction an adjustable bounding means is provided for limiting the return stroke relative to the drive member in a direction of said drive element and connected there is an arresting mechanism having a stop member with respect to which the driven member is freely movable in the driving direction and which stops said driven member in the opposite direction. A periodically operatively actuated member is provided for taking along said drive element in the driving direction over a distance the length of which is dependent on the length of the free stroke made before by the drive element.

In a known mechanism of this type there is applied a ratchet wheel which is driven by a reciprocating drive pawl and is stopped by a stationary pawl. The reciprocating pawl is actuated by a rotating cam, and the free return stroke of the pawl is defined by an adjustable stop member. It is a disadvantage of this construction that the feed is not controllable without increments, as the smallest feed corresponds with one pitch or a multiplicity of one pitch of the ratchet wheel. Another disadvantage is that, for example, when the unloader of a waggon is driven and the waggon is fully loaded, so that the forces that are to be created must be very large, the stroke at the end of the unloading is larger than in the beginning owing to the spring in the entire mechanism.

If the feed is controlled without incremental operation, so that the feed could be controlled with a very fine setting, the influence of the springing of the mechanism is proportionally much greater. This springing is particularly highly disadvantageous when a freewheel clutch is used for the continuously variable control, and preferably so with a counter-freewheel clutch as stop mechanism. Such freewheel clutches consist of an inner ring and an outer ring with gripping pieces or gripping rollers inserted therebetween. In actual practice the mere resilience of the material of these rings and the rollers or gripping pieces appears to have such great influence that at the end of the unloading period, when the forces are much smaller and hence also the loss in the effective stroke is much smaller owing to the spring-back, the difference between the feed and the initial feed when the unloading period started is much too great, in the proportion of as much as a multiple.

It is an object of this invention to provide a drive mechanism which enables a continuously variable control of the feed and ensures that the feed is substantially equal at the start and at the end of the unloading period, without it being necessary to re-set the mechanism.

In a drive mechanism according to this invention a spring means retains the stop member, so that, in arresting the driven member, the stop member, in dependence of the magnitude of the restraining force or countertorque to be applied to the driven member, makes a movement against the action of the spring means, and, in making this movement, acts the bounding means in such a manner that the free return stroke of the drive element is larger accordingly as the restraining force is larger.

This device is preferably so constructed as to have a rotating freewheel clutch with gripping pieces or gripping rollers interposed between two rings and a corresponding freewheel clutch as arresting mechanism. The inner rings of these clutches may be formed by a common ring for both of the clutches.

Preferably the construction is such that the adjustable bounding means include a rotationally adjustable cam which is displaced by the stop member, when the latter makes its movement against the action of the spring transverse to its setting axis of rotation.

A further special feature of the invention is that the abutment shoulder is mounted on the end of a tube which is arranged about the shaft on which the actuating cam for driving the drive element is mounted, said end of the said tube being mounted in a sliding plate which is moved by the stop member. This makes it possible for the complete mechanism, including the drive shaft and the setting mechanism, to be mounted in a closed oil box.

The conveyor to be driven being fully loaded, the very movement of the stop member itself will be maximal, so that the abutment shoulder enables the drive element to make a maximum free return stroke, as a result of which the effective drive stroke increases and the loss of feed effect on account of the springing is fully compensated. At the end of the discharge, when the forces are small and hence the springing in the mechanism is moderate, so that also only a minor springing need be compensated, the stop member sets back the abutment shoulder to a small extent only, so that in proportion only a small springing compensation becomes effective. As a result it can be achieved, if the transmission ratios and the resilience of the spring member are selected properly, that the feed at the start of the unloading is substantially equal to the feed at the end thereof.

In addition the setting mechanism of the invention makes it possible for the manually operated setting member to be arranged closely within the reach of the driver of a truck on which the apparatus is mounted. Setting may be effected by means of a screw and a screw wheel, or by a pulling means tied around a wheel of the setting tube, or by a pair of such pulling means which are flung around the tube in opposite directions, so that operation from various places is possible.

By virtue of the rotational adjustment of the abutment shoulder, the magnitude of the feed can be determined, while the translation of the abutment shoulder, owing to the movement of the stop member, sees to the compensation of the springing, in such a manner that the feed set is constant during the unloading process.

One embodiment of the present invention will now be illustrated, by way of example, with reference to the accompanying drawings, in which:

FIG. 1 is a side elevation of the mechanism with the cover removed from the oil box;

FIG. 2 is a section taken along the broken line II—II in FIG. 1; and

FIG. 3 is a section taken along the line III—III in FIG. 2.

Referring to the drawings, 1 and 2 each denote a half-section of the oil box in which the mechanism is substantially contained. Mounted on the box section 2 is an elongated subsidiary housing 3 in which the drive shaft 4 extends, as well as the setting tube 5 surrounding said shaft 4.

The tube 5 can be rotated by means of a worm wheel 6 secured thereto, in co-operation with a worm screw 7 which is mounted on a shaft 8 projecting through an opening from the housing 3 and provided with a hand wheel 9 adjacent the driver's seat. Mounted on the shaft, by means of a key 10, is a driving cam 11 having a profiled peripheral surface which is in engagement with a cam follower roller 12 mounted for rotation on a shaft 13. This shaft 13 is contained in an arm 14 of an angular lever which is journalled on the shaft 15 in the box 1, 2. The other arm 16 of the angular lever is provided with a shaft 17 on which two links 18 and 19 are mounted for rotation, which connect the angular lever by way of a shift 20 to the arm 21 which is integral with the outer ring 22 of the driving freewheel clutch. By way of tilting or roller gripping means 23 the outer ring 22 is engaged with the inner ring 24 which is keyed at 25 to the shaft 26 to be driven. The inner ring 24 is extended to also form the self-compensating means or inner ring of the freewheel clutch constituting the arresting mechanism, the outer ring 27 of said freewheel clutch being in engagement with the inner ring 24 by way of the tilting means or gripping rollers 28. Recessed in a radial thickened portion 29 of the outer ring 27 is an accommodation 30 into which extends the hinge-pointed end 31 of the stop member 32 which is constructed as a three-armed rocker and is mounted for swiveling movement in the box 1, 2 on the shaft 33 that is fixed to the box section 2. A second arm 34 of the rocker member 32 engages a set of belleville washers 36 via a guiding pin 35, which washers deliver the arresting force the rocker member 32 has to exercise on the ring 27 of the freewheel clutch via the hinge joint 31.

The third arm 37 of the rocker member 32 is connected to an adjusting plate 39 by means of a hinge pin 38, in which plate the end of the tube 5 is journalled. The plate 39 is guided through a guide screw 40 at the end of the box away from the hinge pin 38. Said screw is inserted into a slot 41 in the plate 39. When the rocker arm 32 reciprocates it causes the plate 39 to move along with its movement via the arm 37 and to be displaced in a direction which substantially corresponds with the line connecting the shafts 4 and 26. Welded to the end of the tube 5 is a cam 42 which serves to define the return stroke of the cam follower roller 12. The lever 14, 16 carrying the roller 12 is biased by a return spring (not shown) which tries to return the follower roller 12. The place where the roller 12 is stopped during the return stroke can be set by turning the tube 5, which setting-up turning is confined by the radial faces 43 and 44 of the rotationally adjustable cam 42, the faces 43 and 44 of which abut against the head of the guide-screw 40 in the extreme positions of rotation of the tube 5.

When the apparatus is in operation to displace a load, the driving force is transmitted to the shaft 26 via the shaft 4, the cam 11, the follower roller 12, the angular lever 14, 16, 19, the links 18, 19, the arm 21, the outer ring 22, the rollers 23 and the inner ring 24. The actual driving period of the drive cam 11 is defined as that portion of the cam's movement which causes movement of the cam follower 12. The actual driving period or driving stroke is variably settable, as more fully described below, and is variably set or adjusted by the self-compensating means. In the co-operation between the ring 22, means 23 and the ring 24 a considerable springing is created depending on the counter torque which the shaft 26 has to overcome, the result of which is that, when the driving cam 11 passes the top of the driving stroke, the follower member 12 keeps following the cam 11 for some distance during the return movement and while the coupling tensile force between the rings 22 and 24 gradually decreases an increasing coupling tensile force is simultaneously created between the rings 24 and 27 of the one-way clutch 24, 27, 28, because the load trying to make a return movement tends to turn the shaft 26 with ring 24 reversely, or, if the load by other means is prevented to make a return movement, the spring energy in the shaft 26 and further elements between the ring 24 and the load tends to turn the ring 24 reversely, so that the ring 27 moves reversely against the driving direction and causes the rocker 32 to turn as well. The pivoting of the rocker compresses the Belleville washers 36, and exerts an arresting force on the outer ring 27 which force increases until the resilient backworking between the parts 22–24 ceases. With the next driving stroke, the coupling tensile force between the rings 22 and 24 has to regain the same magnitude as at the end of the immediately preceding driving stroke before the ring 24 and the ring 22 turn equally so that the total turning of the ring 24 only corresponds with part of the complete driving stroke. Between the outer ring 27, the intermediate means 28 and the inner ring 24 of the one-way clutch 24, 27, 28 there is also produced a resilience effect which, without compensation by the mechanism described above, would enhance the feed error. As the rocker 32 with its arm 37 by means of the hinge pin 38 is connected to the plate 39, this plate will move to the left in a proportion directly dependent on the load or on the elastic energy stored in the parts drivingly inserted between the ring 24 and the load, which proportion in either case is a measure for the elastic back-last in the input driving means and also in the entire mechanism. The plate 39 when moving to the left swings the tube 5 to the left moving the cam 42 carried by the tube 5 to the left, whereby the cam 42 is variably set in a new, adjusted position in proportion to the elastic deformation or springing incurred by the entire driving mechanism, thereby enabling the follower roller 12 to move left as well.

Turned to its driving angular radius again, the cam 11 will meet the follower roller 12 sooner again if the arresting force has become greater and, in proportion, impart a greater stroke to the outer ring 22, which compensates the feed loss owing to springing of the freewheel clutches and possible other variably loaded parts. If the arresting force has become smaller, the roller 12 will be moved back less to the left and the next driving stroke will be smaller. As a result, the springing in the mechanism is self-compensated in proportion to the magnitude of this springing. The self-compensating is achieved through a variably pivoted rocker member 32 which can assume an infinite number of positions around the shaft 33 and hence the countertorque is infinitely variably offset.

During each driving stroke the rocker 32 will always restore the plate 39 into a same zero position corresponding to the position of the rocker 32 in which it no longer compresses the washers 36. The zero position of the plate 39 can further be defined by an abutment member, i.e., the screw 40 in co-operation with the left end of the slot 41 in the plate 39. The embodiment described hereinbefore is one with rotating freewheel clutches. It goes without saying that the principle set out can likewise be applied to clutches of which the elements make linear movements only.

Furthermore the invention is described substantially in combination with an embodiment suitable for driving the conveyor of an unloading waggon. It will be understood that this drive mechanism is applicable in all other cases where similar difficulties with feed losses owing to the springing of the construction and/or the coupling elements are experienced.

I claim:

1. An intermittent drive mechanism comprising; a rotatably mounted output member, drive means having an adjustable drive stroke and including a first one-way clutch for intermittently, rotationally driving said output member in a given direction and developing a countertorque tending to drive the output member in the opposite direction immediately after stoppage of rotation of said output member in said given direction, adjusting means for adjusting the drive stroke of said drive means, and a second one-way clutch driven by said output member having means for regulating said adjusting means as a function of said countertorque.

2. A drive mechanism according to claim 1, wherein said first and second one-way clutches each comprise inner and outer ring members having gripping means therebetween.

3. A drive mechanism according to claim 2, wherein the inner rings of both said one-way clutches is one, common ring.

4. A drive mechanism according to claim 1, wherein said drive means includes an eccentrically mounted drive cam having a profiled surface, a cam follower rotatably mounted to follow said profiled surface and normally in contact therewith, first linkage means interconnecting said cam follower and said first one-way clutch for converting the movement of said cam follower into an intermittent, rotational movement of said output member, and wherein said adjusting means includes movable cam means for moving said cam follower out of contact with said drive cam, and second linkage means interconnecting said movable cam means and said second one-way clutch to move said movable cam means as a function of said countertorque, whereby said cam follower is moved out of contact with said drive cam to vary the periods of actual driving of said drive cam as a function of said countertorque.

5. A drive mechanism according to claim 4, further including secondary means for manually moving said movable cam means.

6. A drive mechanism according to claim 5, further including a closed housing having the drive mechanism mounted therein and having said secondary means projecting therefrom, whereby said movable cam means may be manually moved exteriorly of said housing.

7. An intermittent drive mechanism comprising: a rotatably mounted output member; drive means having a variably settable driving period for intermittently, rotationally driving said output member a predetermined angular distance in a given direction and developing during the intermittent drive thereof a countertorque tending to drive said output member in the opposite direction immediately after stoppage of rotation of said output member in said given direction; and self-compensating means for varying said driving period of said drive means as a function of said countertorque to effectively offset said countertorque; said self-compensating means comprising variably settable means for variably setting each successive driving period of said drive means; and a one-way clutch driven by said output member having means for infinitely varying said variably settable means as a function of said countertorque.

8. An intermittent drive mechanism comprising: a rotatably mounted output member; drive means having a variably settable driving period for intermittently, rotationally driving said output member a predetermined angular distance in a given direction and developing during the intermittent drive thereof a countertorque tending to drive said output member in the opposite direction immediately after stoppage of rotation of said output member in said given direction; and self-compensating means for varying said driving period of said drive means as a function of said countertorque to effectively offset said countertorque to effect intermittent rotation of said ouput member through said predetermined angular distance during each successive driving period of said drive means; whereby said output member is rotationally driven through said predetermined angular distance during each successive driving period of said drive means.

References Cited

UNITED STATES PATENTS

| 2,521,711 | 9/1950 | Galliano | 74—117 |
| 2,834,223 | 5/1958 | Strand | 74—117 |
| 3,071,990 | 1/1963 | Lihtenwoldt | 74—117 |
| 3,096,673 | 7/1963 | Spohn et al. | 74—125.5 |
| 3,340,743 | 9/1967 | Stageberg | 74—116 |

FRED C. MATTERN, Jr., Primary Examiner

W. S. RATLIFF, Jr., Assistant Examiner

U.S. Cl. X.R.

74—117